(12) United States Patent
Taylor

(10) Patent No.: US 6,741,763 B1
(45) Date of Patent: May 25, 2004

(54) OPTICAL DATA TRANSMISSION APPARATUS AND METHOD

(75) Inventor: Henry F. Taylor, College Station, TX (US)

(73) Assignee: The Texas A & M University, College Station, TX (US)

(*) Notice: Subject to any disclaimer, the term of this patent is extended or adjusted under 35 U.S.C. 154(b) by 131 days.

(21) Appl. No.: 10/052,027

(22) Filed: Jan. 17, 2002

Related U.S. Application Data

(60) Provisional application No. 60/262,334, filed on Jan. 17, 2001.

(51) Int. Cl.[7] .............................................. G02F 1/035
(52) U.S. Cl. ................... 385/3; 385/1; 385/2; 359/237; 359/279
(58) Field of Search ........................... 385/1–3; 359/181

(56) References Cited

U.S. PATENT DOCUMENTS 6,097,525 A * 8/2000 Ono et al. .................. 359/181
2002/0015212 A1 * 2/2002 Fujiwara et al. ............ 359/238
2003/0058519 A1 * 3/2003 Ibe et al. ..................... 359/279

* cited by examiner

*Primary Examiner*—Akm Enayet Ullah
*Assistant Examiner*—Sung Pak
(74) *Attorney, Agent, or Firm*—J. Nevin Shaffer, Jr.

(57) ABSTRACT

In a system for transmitting intensity modulated light waves (20) over an optical fiber (18), an optical data transmission apparatus (10) includes a cw laser (12) conformed to emit light at substantially a single frequency. A phase modulator (14) is connected in series with the cw laser (12), wherein the phase modulator (14) is conformed to cause the light from the cw laser (12) to vary in substantially a quadratic manner as a function of time during a time interval T. An intensity modulator (16) is connected in series with the phase modulator (14), wherein the intensity modulator (16) is conformed to transmit or block the light from the phase modulator (14) in accordance with an intensity modulation scheme for transmitting binary data, such that the transmitted light consists of pulses (22) of temporal width T during which the phase of the light varies in substantially a quadratic manner as a function of time.

20 Claims, 4 Drawing Sheets

OPTICAL DATA TRANSMISSION APPARATUS AND METHOD

RELATED APPLICATIONS

The applicant claims the benefit of the provisional patent application filed on Jan. 17, 2001, application Ser. No. 60/262,334.

FIELD OF THE INVENTION

This invention relates to an optical data transmission apparatus and method. In particular, the invention relates, in a system for transmitting intensity modulated light waves over an optical fiber, to an apparatus and method including a cw laser, a phase modulator connected to the cw laser and an intensity modulator connected to the phase modulator.

BACKGROUND TO THE INVENTION

Dispersion in optical fibers, which causes pulse broadening and data rate degradation, results from the dependence of propagation delay on optical frequency, as illustrated in FIG. 1.

The upper plot shows schematically that the delay experienced by light propagating in a dispersive optical fiber is close to a linear function of optical frequency. Since the spectrum of a light pulse has a finite width, this dispersion causes pulse broadening. The middle drawing of FIG. 1 shows a single pulse being broadened by about a factor of three by propagation through the fiber, and the lower sketch shows multiple pulses running together so that "ones" cannot easily be distinguished from "zeroes" in a bit stream after passing through the fiber.

Dispersion is present in all fibers designed for wavelength-division-multiplex (WDM) communication systems. Although several methods to reduce the effect of dispersion are in use or under development, more effective and less expensive dispersion compensation is still a major need for present digital fiber optic systems. In comparison with the 10 Gb/s systems, which represent the state-of-the-art in commercial service, the deleterious effect of dispersion on the ability to demodulate a transmitted bit stream is magnified by about sixteen times in the 40 Gb/s systems now under development. Prototypes of 40 Gb/s systems produced by companies such as JDS Uniphase and Codeon are presently being evaluated by potential customers, and this new technology is expected to be widely deployed for the first time during 2002. Thus, there is a need in the art for a simple method for on-off modulation of a light beam so that short pulses are produced after propagation through a dispersive fiber medium.

SUMMARY OF THE INVENTION

Accordingly, the optical data transmission apparatus and method of the present invention includes, in a system for transmitting intensity modulated light waves over an optical fiber, a cw laser. A phase modulator is connected to the cw laser and an intensity modulator is connected to the phase modulator.

In another embodiment of the invention, in a system for transmitting intensity modulated light waves over an optical fiber, an optical data transmission apparatus includes a cw laser conformed to emit light at substantially a single frequency. A phase modulator is connected in series with the cw laser and is conformed to cause the phase of the light from the cw laser to vary in substantially a quadratic manner as a function of time during a time interval T. An intensity modulator is connected in series with the phase modulator, wherein the intensity modulator is conformed to transmit or block the light from the phase modulator in accordance with an intensity modulation scheme for transmitting binary data such that the transmitted light consists of pulses of temporal width T during which the phase of the light varies in substantially a quadratic manner as a function of time.

In another aspect of the invention, the phase modulator is conformed to adjust the amplitude of the phase change of the light, subject to the constraint that the phase of the light varies in substantially a quadratic manner as a function of time during the time interval T. In a another aspect of the invention, the intensity modulator is selected from a group including Mach-Zehnder and elector absorption modulators. In a further aspect of the invention, the phase modulator is selected from a group including straight waveguides and slow wave waveguides. In another aspect of the invention, a multiplicity of cw lasers each connected to a phase modulator, each of which, in turn, is connected to an intensity modulator, is provided. An optical coupler is connected to each intensity modulator and an optical amplifier is connected to the optical coupler. In a further aspect of the invention, more than two cw lasers are provided in which the frequencies of the more than two cw lasers are different from one another and the frequencies emitted by the more than two cw lasers are in a progression with substantially equal frequency spacing.

In a further aspect of the invention, four cw lasers are provided with a phase modulator connected to each cw laser. An intensity modulator is connected to each phase modulator and a four to one optical coupler is connected to all four intensity modulators. An optical amplifier is connected to the four to one coupler.

In another embodiment of the invention, in a system for transmitting intensity modulated light waves over an optical fiber, a method of producing pulses of light which are compressed in temporal width by transmission over an optical fiber includes the steps of inputting a light wave to a cw laser. A phase modulator is connected to the cw laser, the phase modulator conformed to transmit a phase-modulated pulse of light adjusted for amplitude and width. An intensity modulator is connected to the phase modulator, the intensity modulator conformed to transmit a phase-modulated pulse of light and to block light outside of the pulse of light of a particular width.

In a another embodiment of the invention, in a system for transmitting intensity modulated light waves over an optical fiber, a method of producing pulses of light which are compressed in temporal width by transmission over an optical fiber includes the steps of inputting light from a cw laser which emits light at substantially a single frequency. A phase modulator is connected in series with the cw laser, where and the phase modulator causes the phase of the light from the cw laser to vary in substantially a quadratic manner as a function of time during a time interval T, such that the amplitude in temporal width T can be adjusted. An intensity modulator is connected in series with the phase modulator, wherein the intensity modulator is adjusted to transmit or block the light from the phase modulator in accordance with an intensity modulation scheme for transmitting binary data, such that the transmitted light consists of pulses of temporal width T during which the phase of the light varies in substantially a quadratic manner as a function of time, and the temporal width T can be adjusted.

DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE INVENTION

Figure 1:
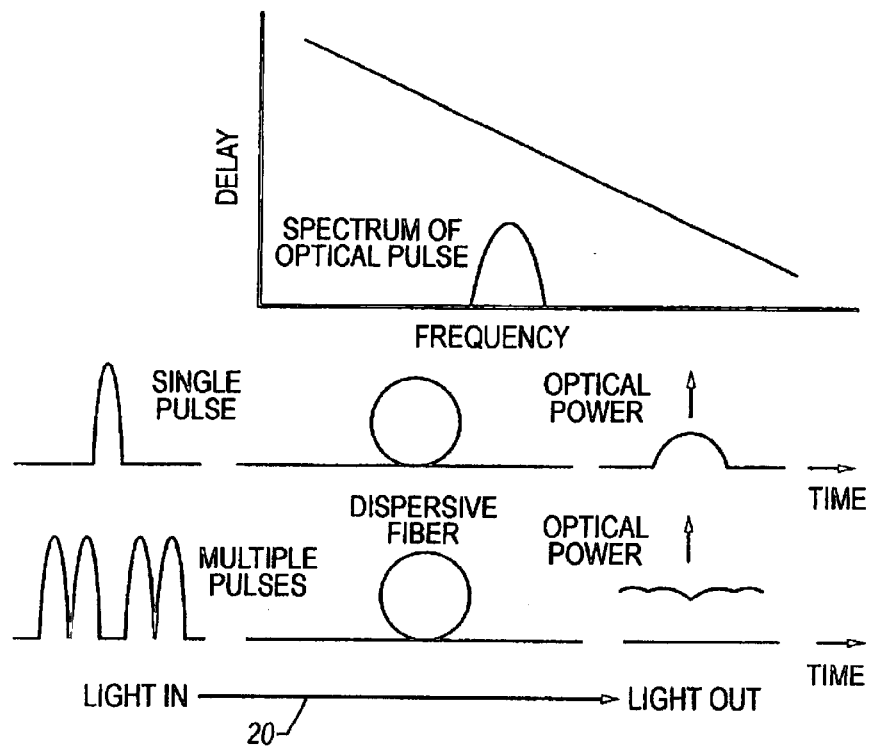
FIG. 1 is a schematic illustration of the effect of uncompensated dispersion in optical fiber systems.
Figure 2:
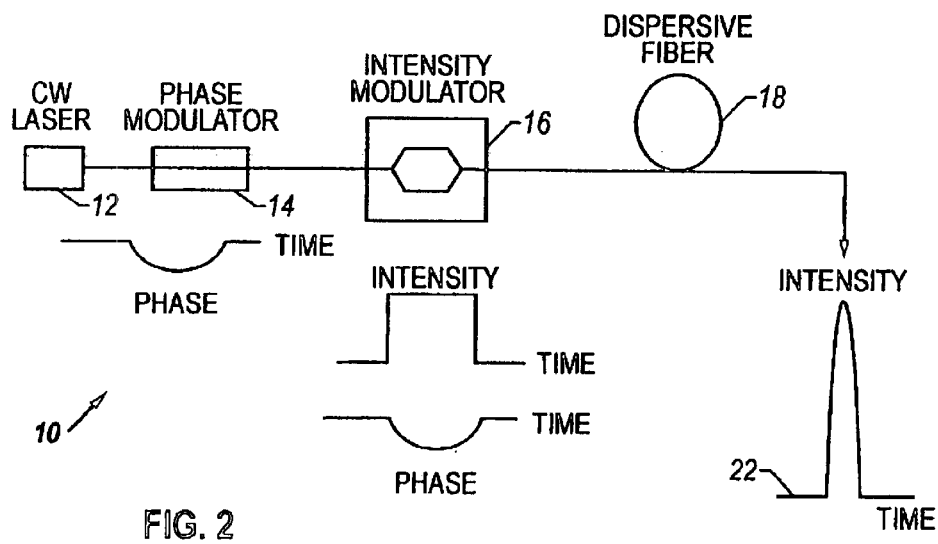
FIG. 2 is a schematic illustration of the optical data transmission apparatus of the present invention showing use of phase modulation and intensity modulation to produce a compressed pulse after transmission over a dispersive optical fiber.
Figure 3:
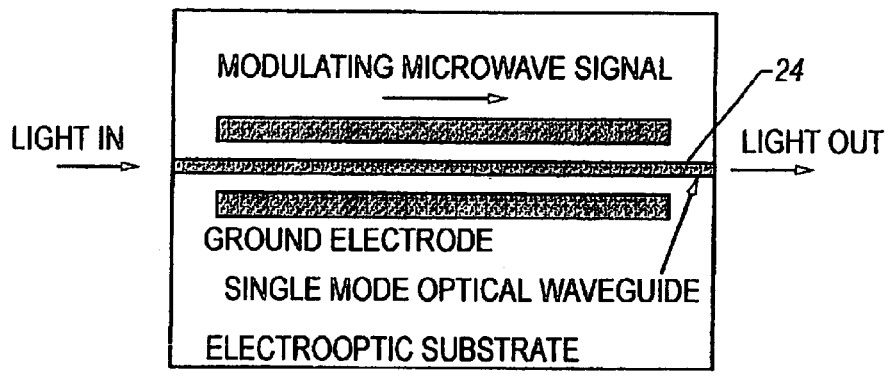
FIG. 3 is an illustration of the phase modulator of the present invention in the form of a straight waveguide.
Figure 4:
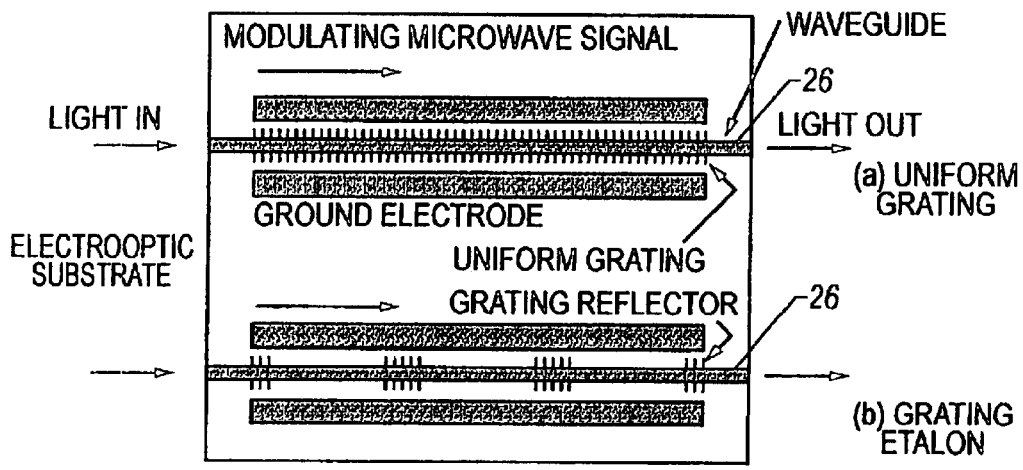
FIGS. 4a and 4b are illustrations of a slow wave phase modulator of the present invention usually a uniform grating (4a) and a grating etalon (4b)

The preferred embodiment of the present invention is illustrated by way of example in FIGS. 2–9. With specific reference to FIG. 2, the optical data transmission apparatus 10 of the present invention includes a cw laser 12. A phase modulator 14 is connected in series to the cw laser 12. An intensity modulator 16 is connected thereafter to the phase modulator 14. FIG. 2 illustrates that intensity modulator 16 is connected to dispersive fiber 18.

The optical data transmission apparatus 10 of the present invention makes use of a combination of phase and intensity modulation acting on a continuous (cw) light wave 20 to produce pulses 22 which are compressed in temporal width by transmission over an optical fiber 18. The invention also provides for combining bit streams consisting of light pulses generated at a relatively low data rate to produce a single time-division-multiplexed bit stream at a higher data rate, as will be discussed more fully hereafter.

An arrangement of the invention for generating a single compressed pulse 22 is illustrated in FIG. 2. A continuous light wave 20 from a cw laser 12 passes through a phase modulator 14, which causes the phase φ of the light wave 20 to vary in quadratic fashion with time t according to the expression $$\phi(t) = \phi_0 \left[1 - \frac{4(t-t_0)^2}{T^2}\right], \quad -.5T \le t - t_0 \le .5T \quad (1a)$$

$$\phi(t) = 0, \ t-t_0 < -0.5T \text{ or } t-t_0 > 0.5T \quad (1b)$$

Where $t_0$ is the time corresponding to the center of the phase modulation pulse, $\phi_0$ is the amplitude of the phase modulation, and T is the temporal width of the phase modulation pulse.

After passing through the phase modulator 14, the light 20 is incident on an intensity modulator 16, which transmits the phase-modulated pulse and blocks light outside the pulse of width T. With an appropriate choice of the pulse amplitude $\phi_0$, and width T, the pulse 22 will be compressed in time after passing through the fiber 10.

The intensity modulator 16 could be a Mach-Zehnder or electro absorption device of the type used in present-day communication systems or any type of intensity modulator now known or hereafter developed. The phase modulator 14 could be a straight waveguide 24 in an electrooptic material flanked by electrodes, as in FIG. 3. To produce larger phase shifts a slow wave structure 26 as in FIG. 4a or FIG. 4b might be utilized. In either case, the phase modulator 14 is driven by a voltage waveform, which is periodic in time to produce a phase shift, which is approximately a quadratic function of time during a pulse duration T.

The Fourier transform method is used to analyze the propagation of the pulse in the fiber 18 for the invention illustrated in FIG. 2. The electric field amplitude f(z,t) of the modulated optical pulse as it enters the fiber at z=0 can be written $$f(0, t) = e^{i\phi(t)} \ -.5T \le t - t_0 \le .5T \quad (2a)$$

$$f(0, t) = 0 \ t - t_0 < -.5T \text{ or } t - t_0 > .5T \quad (2b)$$

where φ(t) given by eqns. 1a and 1b, and |f(0,t)| has been normalized to unity for the duration of the pulse. The Fourier transform F(z,ω) at z=0 can be written $$F(0, \omega) = \frac{1}{\sqrt{2\pi}} \int_{t_0-.5T}^{t_0+.5T} f(0, t) e^{i\omega t} dt, \quad (3)$$

with ω the radian frequency given by ω=2πν, with ν the optical frequency. After the light propagates a distance L in the fiber, the Fourier transform can be written $$F(L, \omega) = F(0, \omega) e^{i\mu\omega^2}, \quad (4)$$

where μ represents the effect of dispersion in the fiber given by $$\mu = \frac{1}{2} \frac{\partial^2 \beta}{\partial \omega^2} \frac{L}{T^2}, \quad (5)$$

with β the propagation constant of the fiber mode.

The next step in the analysis is to determine f(L,t) by calculating the inverse Fourier transform of F(L,ω) by evaluating the integral in $$f(L, t) = \frac{1}{\sqrt{2\pi}} \int_{-\infty}^{\infty} F(L, \omega) e^{i\omega t} d\omega \quad (6)$$

The normalized temporal dependence of the optical power in the transmitted pulse P(L,t) is given by $$P(L,t) = |f(L,t)|^2 \quad (7)$$

Figure 5:
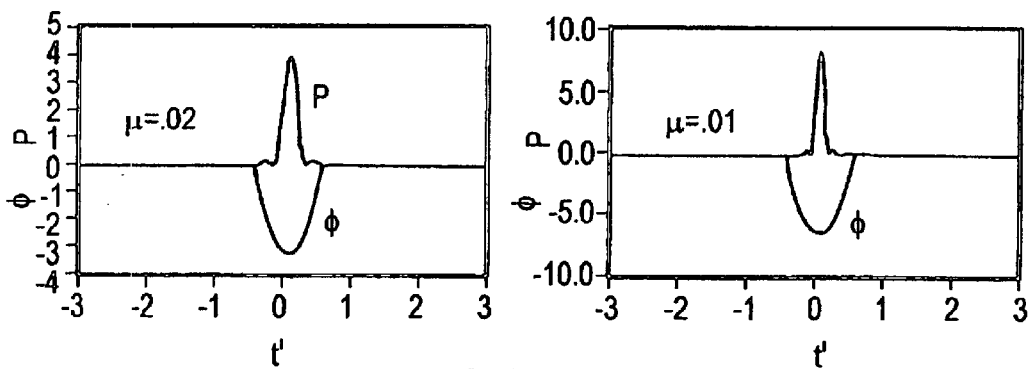
FIG. 5 is a schematic illustration of the temporal dependence of optical power transmitted through a dispersive fiber.

FIG. 5 illustrates the temporal dependence of optical power transmitted through a dispersive fiber, as calculated by the Fourier transform method described above. In these plots, the width of the pulse 22 incident on the fiber 18 at z=0 is T, and t'=(t-t$_0$)/T. Two cases are represented: $\mu$=0.02 and $\phi_0$=−$\pi$rad, and: $\mu$=0.01 and $\phi_0$=−2 $\pi$rad. In both cases the quadratic phase modulation waveforms $\phi$(t) are also plotted.

Calculated plots of transmitted pulse waveforms are given in FIG. 5. In the first case ($\mu$=0.02,$\phi_0$=−$\pi$), the width of the transmitted pulse is 50% that of the incident pulse. In the second case ($\mu$=0.01,$\phi_0$=−2 $\pi$), the width of the transmitted pulse is 25% that of the incident pulse.

In these plots, dispersion is expressed in terms of the dimensionless parameter $\mu$. To relate this to known (i.e., measured) parameters for optical fibers, we first note that $$\Delta t = \partial^2 \beta / \partial \omega^2 L \Delta \omega, \quad (8)$$

with $\Delta t$ the temporal width of the transmitted light pulse, L the fiber length, and $\Delta \omega$ the spectral width of the pulse expressed in terms of radian frequency.

Normally, dispersion in fibers is expressed as a factor $\delta$, with units of ps/(nm-km), such that $$\Delta t' = (\delta L)'(\Delta \lambda)' \quad (9)$$

with $\Delta t'$ the temporal width of the transmitted light pulse in ps and $\Delta \lambda'$ the spectral width of the pulse in nm. The quantity ($\delta L$)' has units of ps/nm. To convert this to standard mks units, we note that $$(\delta L)'(ps/nm) = (\delta L)(s/m) \times (10^{12} ps/s) \times (10^{-9} m/nm) = 10^3 (\delta L)(s/m)$$

Then, eq. (9) becomes $$\Delta t = 10^{-3} (\delta L)'(\Delta \lambda), \quad (10)$$

with $\Delta t$ in s, $\Delta \lambda$ in m, and ($\delta L$)' in ps/nm.

The next step is to relate a wavelength change $\Delta \lambda$ to a change in radian frequency $\Delta \omega$. This is done by noting that $\lambda v = c$, with c the free-space speed of light, and $\omega = 2 \pi v$. Thus, $$\omega = 2 \pi c / \lambda \quad (11)$$

and $$\Delta \lambda = (\lambda^2 / 2 \pi c) \Delta \omega \quad (12)$$

With this substitution, eq. (10) becomes $$\Delta t = \frac{10^{-3} (\delta L)' \lambda^2 (\Delta \omega)}{2\pi c} \quad (13)$$

Comparing this equation to eq. (8), it follows that $$\frac{\partial^2 \beta}{\partial \omega^2} L = \frac{10^{-3} (\delta L)' \lambda^2}{2\pi c} \quad (14)$$

Using numerical values $\lambda$=1.55 $\mu$m and c=3×10$^8$ m/s, we calculate that $$\frac{\partial^2 \beta}{\partial \omega^2} L = 1.275 \times 10^{-24} (\delta L)' \quad (15)$$

Finally, from eq. (5) it follows that $$\mu = 6.37 \times 10^{-25} (\delta L)' / T^2, \quad (16)$$

where $\mu$ is dimensionless, the units of ($\delta L$)' are ps/nm, and the units of T are s.

The results now make it possible to make some numerical calculations for cases of interest. First, we can generalize from the data of FIG. 5 that, to achieve a short pulse after propagating through a dispersive fiber, the desired value of $\mu$ is $$\mu = 0.04 T_c / T, \quad (17)$$

and the corresponding phase shift amplitude is $$\Delta \phi_0 = -0.5 \pi T / T_c, \quad (18)$$

with $T_c$ the width of the compressed pulse.

As an example, if ($\delta L$)'=150 ps/nm and the width of the modulated pulse coupled into the fiber T=100 ps, then from eq. (16)$\mu$=0.0095. From eq. (17), it follows that the width of the compressed pulse $T_c$=23.9 ps. From eq. (18), the required phase shift $\Delta \phi_0$ is −2.09 $\pi$rad.

Figure 6:
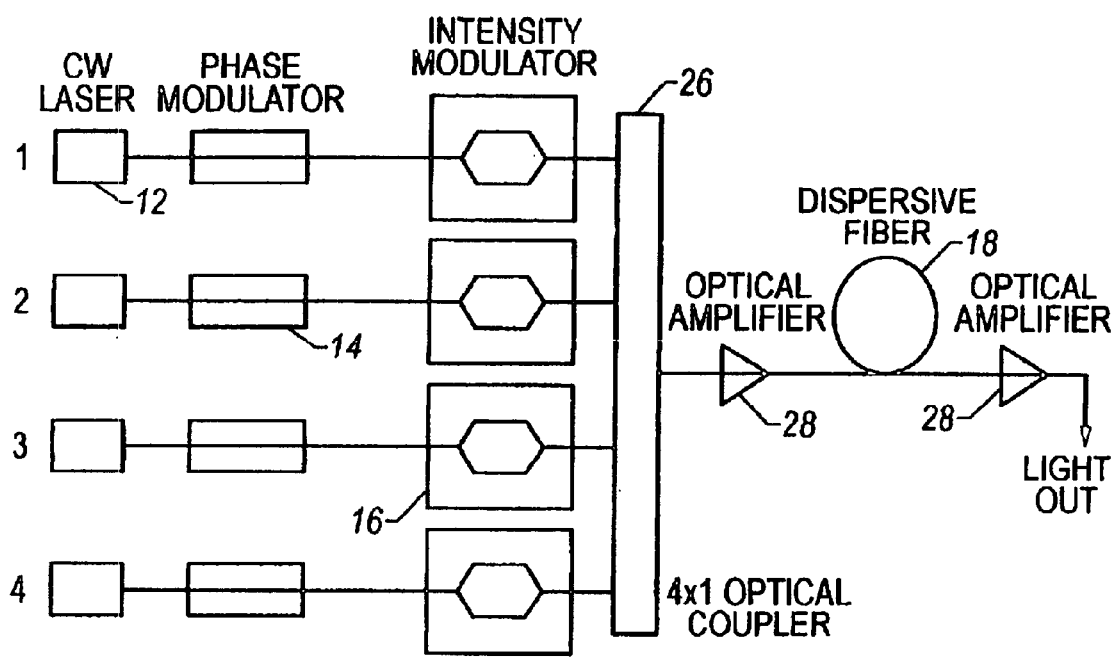
FIG. 6 is a schematic illustration of a preferred embodiment of the present invention for interleaving bit streams from multiple transmitters.

Optical bit streams produced by the invention illustrated in FIG. 2 can be interleaved to produce multiplexed bit streams at a higher data rate, using the configuration of the invention illustrated in FIG. 6. Modulated light in the four transmitter channels is combined in a four by one optical coupler 26 and amplified optically in an optical amplifier 28 before transmission over a dispersive fiber 18. The four cw lasers 12 are tuned to operate at equally spaced frequencies $v_1$, $v_2$, $v_3$, and $v_4$, such that the dispersion-induced delay for adjacent frequencies is displaced by one bit period for the compressed pulses. For example, for propagation at a multiplexed data rate of 40 Gb/s, the bit period is 25 ps, requiring a wavelength spacing of 0.17 nm for the adjacent channels. Since a wavelength change of 0.8 nm corresponds to a frequency change of 100 GHz in the 1550 nm spectral region, the optical spacing for adjacent frequencies would be 20.8 GHZ.

Figure 7:
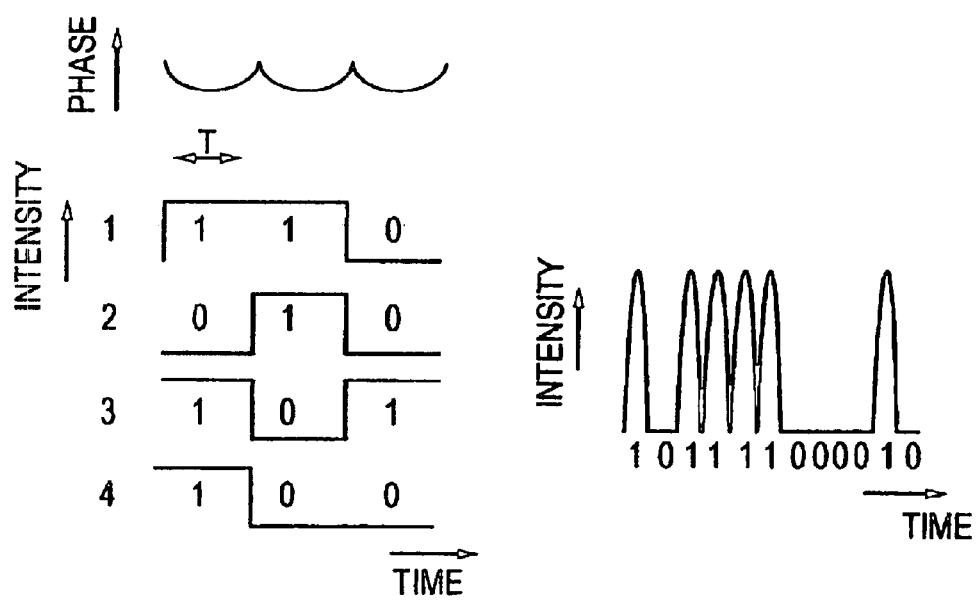
FIG. 7 is a schematic illustration of the use of the invention illustrated in FIG. 6 whereby a dispersion induced delay differential is used for interleaving parallel bit streams from four transmitters to produce a single serial bit stream after transmission through a dispersive fiber.

The manner in which the four data streams are interleaved is illustrated in FIG. 7. Assuming a fourfold compression of the optical pulses generated by each transmitter, bits from the first transmitter will arrive at the receiver in bit periods 1, 5, 9, . . . ; from the second transmitter in bit periods 2, 6, 10, . . . , etc.

Again, FIG. 7 illustrates the use of dispersion-induced delay differential for interleaving of parallel bit streams from four transmitters to produce a single serial bit stream after transmission through a dispersive fiber 18.

Figure 9:
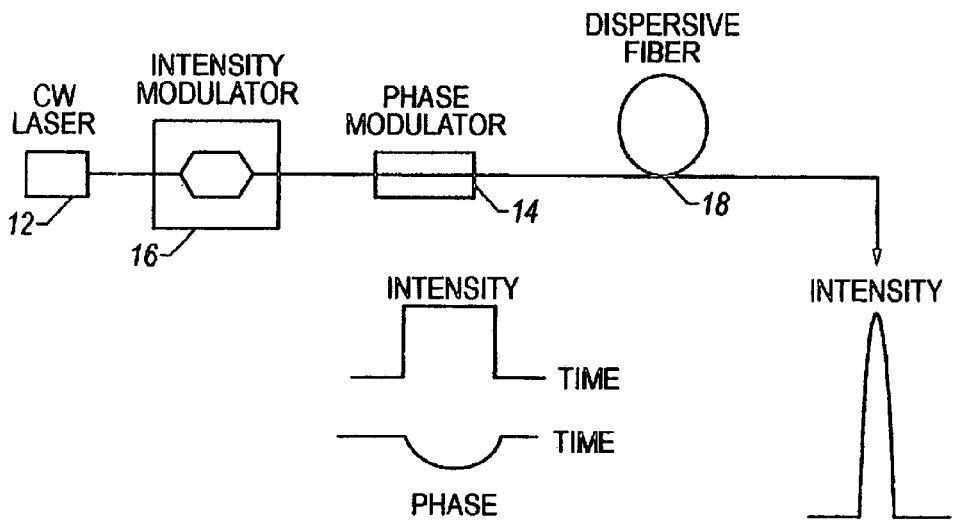
FIG. 9 is a schematic illustration of an embodiment of the invention set forth in FIG. 2 wherein the phase modulator follows the intensity modulator.

In FIGS. 2 and 6, the phase modulators 14 precede the intensity modulators 16 in the optical train. Applicant has determined that the order of these components can be reversed without materially affecting the system performance as illustrated in FIG. 9.

Figure 8:
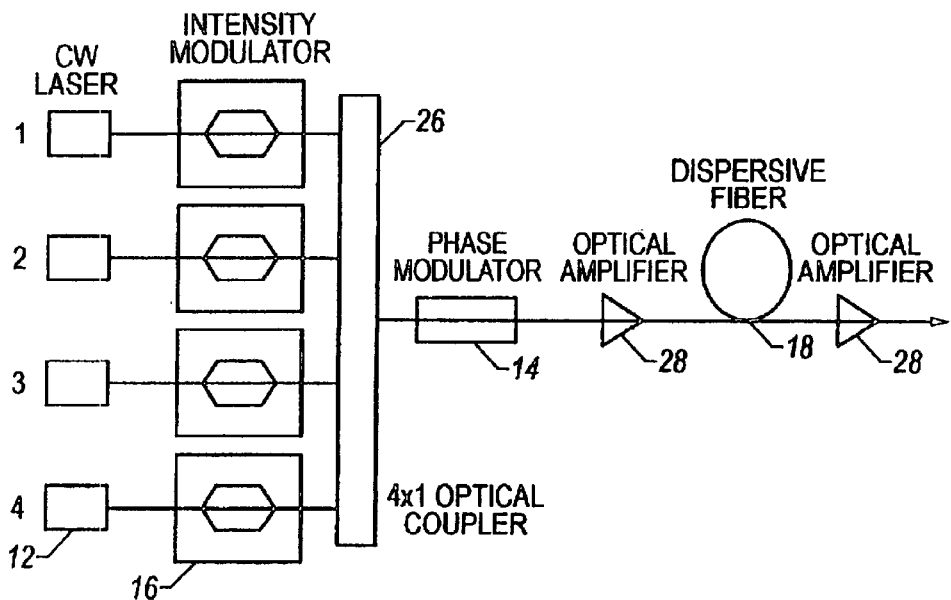
FIG. 8 is a schematic illustration of a variation of the embodiment set forth in FIG. 6 wherein a single phase modulator is utilized in conjunction with a four by one optical coupler.

Additionally, in FIG. 6, the four phase modulators 14 located adjacent to the cw lasers 12 may be replaced by a single-phase modulator 14 located following the four by one optical coupler 28 as illustrated in FIG. 8. In that case, the single-phase modulator 14 simultaneously acts on all four multiplexed data channels.

Additional modification and permutations may be created as well. For instance, FIG. 6 shows multiplexed data within a single WDM channel. Two or more of these WDM channels can be combined at the transmitter and separated at the receiver using standard WDM components.

In short, the optical data transmission apparatus and method of the present invention provides significant advantages over the prior art in at least three important areas: (1) performance and cost of dispersion compensation, (2) simplicity and cost of multiplexing of data channels, and (3) reduction in the speed requirements for optical modulators. Each of these is discussed below.

Dispersion compensation is one of the top technology needs in high-data-rate, long-distance optical fiber systems.

First, there is a lot of installed fiber ("legacy fiber") with a dispersion minimum at a wavelength near 1300 nm which is now being used at 1550 nm to take advantage of lower fiber loss and the availability of optical amplifiers in that wavelength regime. This fiber has dispersion so high (of the order of 25 ps/nm-km) that, even with state-of-the-art compensation, the fiber cannot support transmission at 10 Gb/s over significant distances. The technology disclosed here would be ideal for use with this legacy fiber.

For the past several years, fiber with a dispersion minimum near 1570 nm has been installed for use in wavelength multiplexed systems operating in the 1530–1560 spectral band. This fiber has much lower dispersion ($\approx$1–3 ps/nm-km) than the legacy fiber at wavelengths of interest, so less compensation is required for a given fiber length. However, compensation with this newer fiber is difficult because of the variation in dispersion with wavelength ("dispersion slope"). The techniques described in this disclosure could solve this problem for 10 Gb/s systems by tuning the pulse width T and phase modulation amplitude $\phi_0$ within each transmitter to optimize the output pulse width for the dispersion experienced in that particular wavelength channel.

In comparison with the 10 Gb/s systems, which represent the state-of-the-art in commercial service, the deleterious effect of dispersion on the ability to demodulate a transmitted bit stream is magnified by about sixteen times in the 40 Gb/s systems now under development. The invention disclosed herein will be even more important at the higher data rate; e. g., in combining four 10 Gb/s data streams to produce a single 40 Gb/s dispersion-compensated bit stream, as in the example given above.

The ability to multiplex the bit streams optically (e.g., combining four parallel 2.5 Gb/s data streams to form a single 10 Gb/s data stream, or to combine four parallel 10 Gb/s data streams to form a single 10 Gb/s data stream) substantially reduces the cost of electronic subsystems because they will not need to operate at such high speeds as in the conventional systems.

Finally, the ability to use relatively low-speed modulators to generate higher-data-rate bit streams favorably impacts the cost of the modulating devices and reduces their electrical power consumption as well.

The end result of this invention is to provide a more effective and less expensive means of transmitting data at high rates over dispersive optical fiber 18.

The invention makes use of a combination of phase 14 and intensity 16 modulation acting on a continuous (cw) light wave 20 to produce pulses 22 which are compressed in temporal width by transmission over a dispersive optical fiber 18. The invention also provides for combining bit streams consisting of light pulses generated at a relatively low data rate to produce a single time-division-multiplexed bit stream at a higher data rate.

The invention simultaneously addresses three major issues with high-data-rate fiber optic communication systems—dispersion compensation, high-speed modulation of light, and multiplexing. The method is suitable for very high data rate (10 Gb/s and 40 Gb/s) digital fiber optic systems with fibers of arbitrary length and moderate-to-high spectral dispersion. The need for expensive optical dispersion compensation equipment can be eliminated, and requirements on high-speed optical modulators and electronic data multiplexors can be relaxed considerably.

The description of the present embodiments of the invention have been presented for purposes of illustration, but are not intended to be exhaustive or to limit the invention to the form disclosed. Many modifications and variations will be apparent to those of ordinary skill in art. As such, while the present invention has been disclosed in connection with the preferred embodiment thereof, it should be understood that there may be other embodiments which fall within the spirit and scope of the invention as defined by the following claims.

What is claimed is:

1. In a system for transmitting intensity modulated light waves over an optical fiber, an optical data transmission apparatus, the apparatus comprising:

(a) a cw laser conformed to emit light at substantially a single frequency;

(b) a phase modulator connected in series with said cw laser, wherein said phase modulator is conformed to cause the phase of the light from said cw laser to vary in substantially a quadratic manner as a function of time during a time interval T; and (c) an intensity modulator connected in series with said phase modulator, wherein said intensity modulator is conformed to transmit or block the light from said phase modulator in accordance with an intensity modulation scheme for transmitting binary data, such that said transmitted light consists of pulses of temporal width T during which the phase of the light varies in substantially a quadratic manner as a function of time.

2. The apparatus of claim 1 wherein said phase modulator is conformed to adjust the amplitude of the phase change of the light, subject to the constraint that the phase of the light varies in substantially a quadratic manner as a function of time during said time interval T.

3. The apparatus of claim 1 wherein said intensity modulator is selected from a group including Mach-Zehnder and electroabsorption modulators.

4. The apparatus of claim 1 wherein said phase modulator is selected from a group including straight waveguides and slow wave waveguides.

5. The apparatus of claim 1 further comprising:

(a) a plurality of cw lasers each connected to a phase modulator which is connected to an intensity modulator;

(b) an optical coupler connected to each intensity modulator; and (c) an optical amplifier connected to said optical coupler.

6. The apparatus of claim 5 further comprising more than two cw lasers in which the frequencies of said more than two cw lasers are different from one another; and the frequencies emitted by said more than two cw lasers are in a progression with substantially equal frequency spacing.

7. The apparatus of claim 6 further comprising:

(a) four cw lasers;

(b) a phase modulator connected to each cw laser;

(c) an intensity modulator connected to each phase modulator;

(d) a four to one optical coupler connected to all four intensity modulators; and (e) an optical amplifier connected to said four to one optical coupler.

8. In a system for transmitting intensity modulated light waves over an optical fiber, a method of producing pulses of light which are compressed in temporal width by transmission over an optical fiber, the method comprising the steps of:

(a) inputting light from a cw laser which emits light at substantially a single frequency;

(b) connecting a phase modulator in series with said cw laser, wherein said phase modulator causes the phase of the light from said cw laser to vary in substantially a quadratic manner as a function of time during a time interval T, such that the amplitude and temporal width T of said phase modulation can be adjusted; and (c) connecting an intensity modulator in series with said phase modulator, wherein said intensity modulator is adjusted to transmit or block the light from said phase modulator in accordance with an intensity modulation scheme for transmitting binary data, such that said transmitted light consists of pulses of temporal width T during which the phase of the light varies in substantially a quadratic manner as a function of time, and the temporal width T can be adjusted.

9. The method of claim 8 further comprising the steps of:

(a) providing a plurality of cw lasers emitting at different, equally spaced optical frequencies, each connected to a phase modulator connected to an intensity modulator;

(b) connecting an optical coupler to the plurality of intensity modulators; and (c) connecting an optical amplifier to the optical coupler.

10. The method of claim 9 further comprising the steps of:

(a) inputting light from four cw lasers emitting at different, equally spaced optical frequencies;

(b) connecting a phase modulator to each of the four cw lasers;

(c) connecting an intensity modulator to each phase modulator;

(d) connecting a four to one optical coupler to all four intensity modulators; and (e) connecting an optical amplifier to the four to one optical coupler.

11. In a system for transmitting intensity modulated light waves over an optical fiber, an optical data transmission apparatus, the apparatus comprising:

(a) a cw laser which emits light at substantially a single frequency;

(b) an intensity modulator connected in series with said cw laser, wherein said intensity modulator is adjusted to transmit or block the light from said cw laser in accordance with an intensity modulation scheme for transmitting binary data, such that said transmitted light consists of pulses of temporal width T; and (c) a phase modulator connected in series with said intensity modulator, wherein said phase modulator causes the phase of the light from said intensity modulator to vary in substantially a quadratic manner as a function of time during a time interval T, said time interval T being said temporal width of said pulse from said intensity modulator.

12. The apparatus of claim 11 wherein said phase modulator is conformed to adjust the amplitude of the phase change of the light, subject to the constraint that the phase of the light varies in substantially a quadratic manner as a function of time during said time interval T.

13. The apparatus of claim 11 wherein said intensity modulator is selected from a group including Mach-Zehnder and electroabsorption modulators.

14. The apparatus of claim 11 wherein said phase modulator is selected from a group including straight waveguides and slow wave waveguides.

15. The apparatus of claim 11 further comprising:

(a) a plurality of N cw lasers each connected to an intensity modulator;

(b) an optical coupler connected to said plurality of N intensity modulators;

(c) a phase modulator which is connected to said optical coupler;

(d) an optical amplifier connected to said phase modulator.

16. The apparatus of claim 15 in which the frequencies of said N cw lasers are different from one another; and, in the case that N>2, the N frequencies emitted by said cw lasers are in a progression with substantially equal frequency spacing.

17. The apparatus of claim 15 further comprising:

(a) four cw lasers;

(b) an intensity modulator connected to each cw laser;

(c) a four to one optical coupler connected to all four intensity modulators;

(d) a phase modulator which is connected to said optical coupler; and (e) an optical amplifier connected to said phase modulator.

18. In a system for transmitting intensity modulated light waves over an optical fiber, a method of producing pulses of light which are compressed in temporal width by transmission over an optical fiber, the method comprising the steps of:

(a) inputting light from a cw laser which emits light at substantially a single frequency;

(b) connecting an intensity modulator in series with said cw laser, wherein said intensity modulator is adjusted to transmit or block the light from said cw laser in accordance with an intensity modulation scheme for transmitting binary data, such that said transmitted light consists of pulses of temporal width T; and (c) connecting a phase modulator in series with said intensity modulator, wherein said phase modulator causes the phase of the light from said intensity modulator to vary in substantially a quadratic manner as a function of time during a time interval T, said time interval T being said temporal width of said pulse from said intensity modulator.

19. The method of claim 18 further comprising the steps of:

(a) providing a plurality of N cw lasers emitting at different, equally spaced optical frequencies, each connected to an intensity modulator;

(b) connecting an optical coupler to the plurality of N intensity modulators;

(c) connecting a phase modulator to said optical coupler; and (d) connecting an optical amplifier to the optical coupler.

20. The method of claim 19 further comprising the steps of:

(a) inputting light from four cw lasers emitting at different, equally spaced optical frequencies;

(b) connecting an intensity modulator to each of the four cw lasers;

(c) connecting a four to one optical coupler to all four intensity modulators;

(d) connecting a phase modulator to said optical coupler; and (e) connecting an optical amplifier to the four to one optical coupler.

* * * * *